United States Patent
Arbree

(10) Patent No.: US 10,026,213 B1
(45) Date of Patent: Jul. 17, 2018

(54) FILTERING FOR 3D SCENE RENDERING USING RAY DIVERGENCE

(71) Applicant: Autodesk, Inc., San Rafael, CA (US)

(72) Inventor: Adam Arbree, Tiburon, CA (US)

(73) Assignee: Autodesk, Inc., San Rafael, CA (US)

( * ) Notice: Subject to any disclaimer, the term of this patent is extended or adjusted under 35 U.S.C. 154(b) by 177 days.

(21) Appl. No.: 15/078,828

(22) Filed: Mar. 23, 2016

(51) Int. Cl.
*G06T 15/06* (2011.01)

(52) U.S. Cl.
CPC .................................. *G06T 15/06* (2013.01)

(58) Field of Classification Search
None
See application file for complete search history.

(56) References Cited

PUBLICATIONS

Kontkanen J, Räsänen J, Keller A (2006) Irradiance filtering for monte carlo ray tracing. Monte Carlo and Quasi-Monte Carlo Methods 2004: 259-272.J. KontkanenJ. RäsänenA. Keller2006Irradiance filtering for monte carlo ray tracing.Monte Carlo and Quasi-Monte Carlo Methods2004259272. Downloadable from—https://mediatech.aalto.fi/~janne/irradiancefi.*
John Amanatides, "Ray Tracing with Cones," Department of Computer Science, University of Toronto [Mar. 8, 2016] [online] (retrieved from http://www.cs.yorku.ca/~amana/research/cones.pdf), 5 pages.
Burley, Brent "Physically-Based Shading at Disney." SIGGRAPH 2012 Course: Practical Physically Based Shading in Film and Game Production. Published Aug. 31, 2012. 26 Pages.
Homan Igehy, "Tracing Ray Differentials," Computer Science Department, Stanford University (Feb. 24, 2015) [online] (retrieved from http://graphics.stanford.edu/papers/trd/trd_ jpg.pdf), 8 pages.
Frank Suykens and Yves D. Willems, "Path Differentials and Applications," Department of Computer Science, K.U. Leuven, Belgium (Feb. 24, 2015) [online] (retrieved from http://graphics.cs.kuleuven.be/publications/PATHDIFFtr/PATHDIFFtr_paper.pdf), 13 pages.
Unknown Author, "Mipmap—Wikipedia, the free encyclopedia," (Mar. 8, 2016) [online] (retrieved from https://en.wikipedia.org/wiki/Mipmap), 4 pages.
Unknown Author, "Gallery—Autodesk® A360," (Feb. 23, 2016) [online] (retrieved from https://gallery.autodesk.com/a360rendering), 6 pages.

(Continued)

*Primary Examiner* — Mark Zimmerman
*Assistant Examiner* — Nurun N Flora
(74) *Attorney, Agent, or Firm* — Fish & Richardson P.C.

(57) ABSTRACT

Systems and techniques relating to scene rendering in computer graphics applications, such as rendering a scene using image based lighting, include a method including: performing, by a computer, ray tracing for a scene to be rendered by the computer, wherein performing the ray tracing include calculating a ray spread value for a ray propagated through the scene, the ray spread value being calculated based on a reflection geometry of at least one surface within the scene, and calculating a ray divergence value for the ray propagated through the scene, the ray divergence value being calculated based on one or more material properties of the at least one surface; defining, by the computer, a filter using both the calculated ray spread value and the calculated ray divergence value; and rendering, by the computer, the scene using the filter.

35 Claims, 5 Drawing Sheets

(56) References Cited

PUBLICATIONS

Unknown Author, "Rendering in Autodesk® A360," (Feb. 23, 2016) [online] (retrieved from https://gallery.autodesk.com/a360rendering), 14 pages.

Unknown Author, "About Rendering in A360," (Feb. 23, 2016) [online] (retrieved from http://docs.autodesk.com/ADSK360/help/ENU/rendering/index.htm#!/url=./files/GUID-387E4CB4-CD53-48C9-BB1A-E7A243CF4383.htm), 70 pages.

Ward, Gregory J. "Measuring and Modeling Anisotropic Reflection." ACM SIGGRAPH Computer Graphics, vol. 26, Issue 2. Published Jul. 1992. ACM-0-89791-479-1/92/007/0265. pp. 265-272.

* cited by examiner

FILTERING FOR 3D SCENE RENDERING USING RAY DIVERGENCE

BACKGROUND

This specification relates to scene rendering in computer graphics applications, such as rendering a three dimensional (3D) scene using image based lighting.

Rendering a 3D scene to a two dimensional (2D) image for display in computer graphics applications often involves using ray tracing techniques. In basic ray tracing, for each pixel in the image, random rays are traced through that pixel (via a virtual camera) into the scene. The value of that pixel will be noisy if, for all the rays in that pixel, only a very few of them hit a small bright light source. In this case, within a small group of neighboring pixels in the image, some will have rays that hit the light and others will not. Since the light is often very bright, those that hit it will have a significantly different value than those that don't. This can result in objectionable noise that should be removed.

To address this problem, a filtering step can be added when looking up the value of the light source. Using a filter, instead of just looking at the value of emission where the ray hit, the values of the emission can be averaged over a region near the intersection point of the ray. This tends to make it more probable that the light will be included in the average. Thus, most nearby rays will include the light source's contribution, and the pixels will have a more uniform value. In other words, by filtering the image used for lighting, the light source contributions can be smoothed out so as to reduce artifacts in the rendering. However, this filtering can also change image appearance, so determining the proper amount of filtering has a significant impact on the quality of the final rendering of the image for the scene.

SUMMARY

This specification describes systems and techniques relating to scene rendering in computer graphics applications, such as rendering a scene using image based lighting. In general, one or more aspects of the subject matter described in this specification can be embodied in a method including: performing, by a computer, ray tracing for a scene to be rendered by the computer, wherein performing the ray tracing include calculating a ray spread value for a ray propagated through the scene, the ray spread value being calculated based on a reflection geometry of at least one surface within the scene, and calculating a ray divergence value for the ray propagated through the scene, the ray divergence value being calculated based on one or more material properties of the at least one surface; defining, by the computer, a filter using both the calculated ray spread value and the calculated ray divergence value; and rendering, by the computer, the scene using the filter.

Calculating the ray spread value can include computing a ray differential for the ray propagated through the scene, and calculating the ray divergence value can include computing an estimate of divergence based on the one or more material properties and a geometric model of light diffusion. The geometric model of light diffusion can be a circular cone, and the estimate of divergence can be represented using only an interior angle between a central vector and an outer edge of the circular cone. Moreover, the at least one surface can include a first surface and a second surface, and calculating the ray divergence value can include computing a three dimensional convolution of a first circular cone and a second circular cone, the first circular cone corresponding to an estimate of divergence for the first surface, and the second circular cone corresponding to an estimate of divergence for the second surface.

Defining the filter can include: fitting a ray spread cone to the ray differential for the ray propagated through the scene; computing a three dimensional convolution of a final ray divergence cone with the ray spread cone to generate a combined cone; and converting the combined cone to a size for the filter. Further, converting the combined cone to the size for the filter can include using mipmapping to determine an area to filter color.

Rendering the scene using the filter can include using the filter when evaluating emission of a textured light source. The filter can have an area defined by both the calculated ray spread value and the calculated ray divergence value, and using the filter when evaluating emission of the textured light source can include returning an average of the emission of the textured light source from the area around a point of intersection of the ray with the textured light source.

One or more aspects of the subject matter described in this specification can also be embodied in a non-transitory computer readable medium storing computer program instructions, the program instructions including instructions that cause one or more processors to perform operations including: receiving a request to render a three dimensional (3D) scene including an object with a surface that is curved and at least partially reflective; performing, responsive to the request, ray tracing for the 3D scene, wherein performing the ray tracing includes calculating a ray spread value for a ray propagated through the 3D scene and reflected off the surface of the object, the ray spread value being calculated based on a geometric aspect of the curved and at least partially reflective surface, and calculating a ray divergence value for the ray propagated through the 3D scene and reflected off the surface of the object, the ray divergence value being calculated based on a diffusive property of the curved and at least partially reflective surface; defining a filter using both the calculated ray spread value and the calculated ray divergence value; and rendering the scene using the filter.

The operations can include one or more steps of the above methods. Calculating the ray spread value can include computing a ray differential for the ray propagated through the 3D scene, and calculating the ray divergence value can include computing an estimate of divergence based on the diffusive property and a geometric model of light diffusion. Furthermore, one or more aspects of the subject matter described in this specification can also be embodied in a system including a non-transitory storage medium having instructions stored thereon, and one or more data processing apparatus configured to run the instructions to perform one or more steps of the above methods.

A system can include: a non-transitory storage medium having instructions of a three dimensional (3D) scene rendering program stored thereon; and one or more data processing apparatus configured to run the instructions of the 3D scene rendering program to (i) receive a request to render a 3D scene including at least one surface, (ii) perform ray tracing for the 3D scene including (a) calculating a ray spread value for a ray propagated through the 3D scene, the ray spread value being calculated based on a reflection geometry of the at least one surface within the 3D scene, and (b) calculating a ray divergence value for the ray propagated through the 3D scene, the ray divergence value being calculated based on one or more material properties of the at least one surface, (iii) define a filter using both the calculated ray spread value and the calculated ray divergence value, (iv) render the 3D scene using the filter, and (v) provide the rendered 3D scene for display. Further, calculating the ray spread value can include computing a ray differential for the ray propagated through the scene, and calculating the ray divergence value can include computing an estimate of divergence based on the one or more material properties and a geometric model of light diffusion.

Particular embodiments of the subject matter described in this specification can be implemented to realize one or more of the following advantages. The proper amount of filtering for use in image based lighting during rendering an image can be determined quickly and efficiently. Further, this can be done readily for a wide variety of materials modeled in 3D scenes. The quality of the final rendering of an image for a scene can be improved by using image based filtering that takes into account details of the scene, such as glossy materials used for objects in the scene. This can result in a reduction of noise in the generated image without an undesirable change in image appearance.

Moreover, the process can be fully automated and generally applicable, potentially avoiding any need for manual or ad-hoc increases in the filter size to account for material effects that aren't captured by traditional ray differentials and path differentials. Thus, the amount of filtering to be used can be rapidly estimated for different scenes with a wide variety of objects and material properties, without requiring user input to indicate how much filtering is needed for the materials that are modeled in a particular 3D scene. For example, effective reduction of artifacts can be provided rapidly in a rendered scene, while introducing minimal changes to the image appearance, for scenes that include a variety of glossy materials since the algorithm can provide a fast to compute, easy to implement and general method for estimating the minimum filtering required to produce higher quality renderings using image based lighting while minimally altering the final image appearance.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
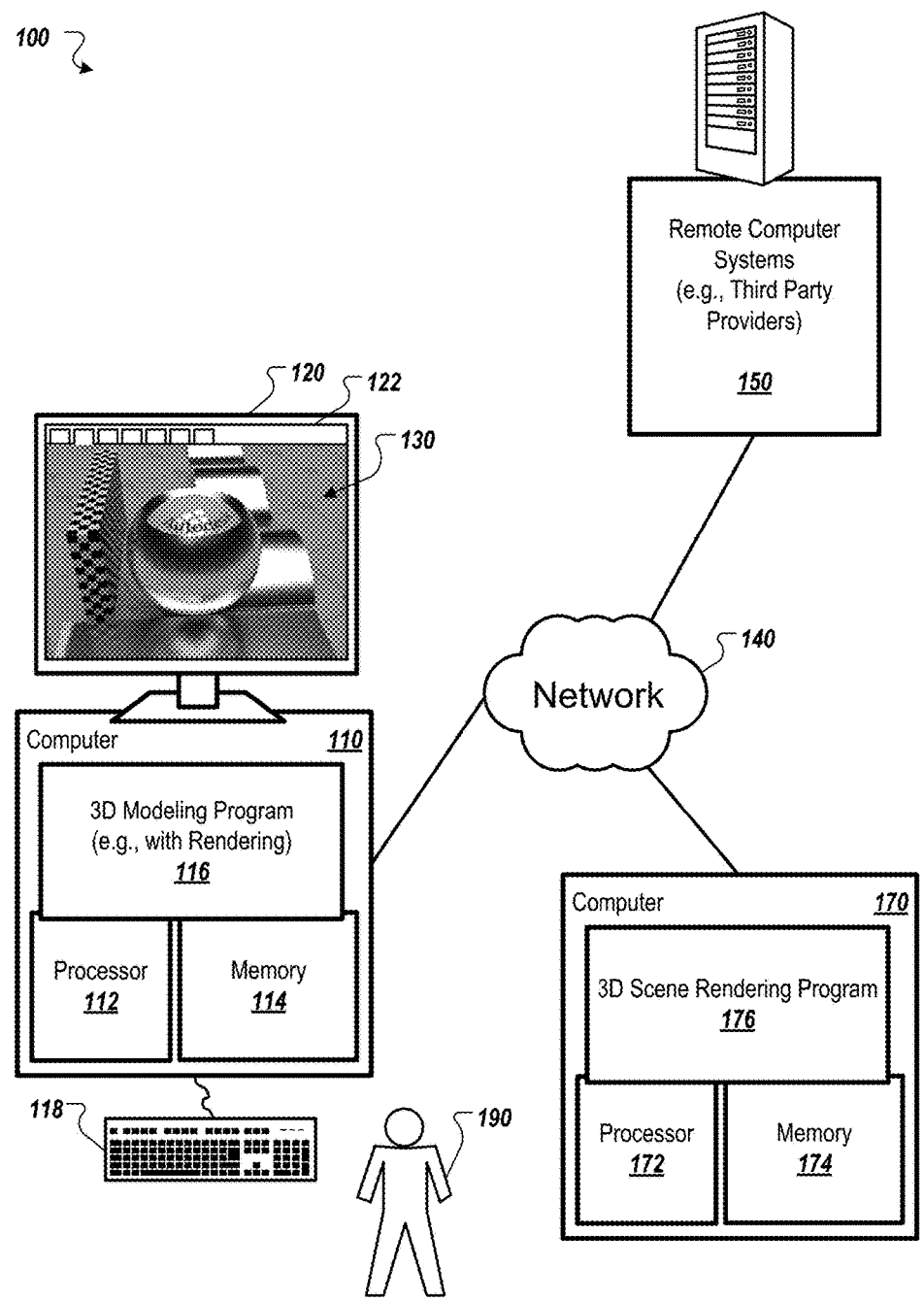
FIG. 1 shows an example of a system usable to render a three dimensional (3D) scene to a two dimensional (2D) image for display.

FIG. 1 shows an example of a system 100 usable to render a three dimensional (3D) scene to a two dimensional (2D) image for display. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can include instructions for rendering a 3D model 130 for display. The 3D modeling program 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the 3D modeling program 116 to create a 3D model 130. This can be done using known graphical user interface tools. The 3D model 130 can include various objects with different surface properties, as shown. As will be appreciated, the UI 122 can enable the creation of complex 3D scenes, including animated sequences, in which the 3D objects in the scene can have different properties, including color, reflection, refraction, and diffusion. While simplified renderings can be used during design of the 3D scene, a final work product can require significant processing resources to render a complex scene with different objects with different geometries and surface properties. In addition, for the creation of animated sequences, many full renderings of the 3D scene from different perspectives may be required.

To provide additional processing resources for this rendering, one or more remote computer systems 150 (e.g., one or more third party providers' one or more server systems accessible by the computer 110 via the network 140) can be used. Thus, in addition to running the 3D modeling program 116 locally on computer 110, additional programs on remote computers can be run to support the activities of the program 116. For example, a computer 170 can include a processor 172 and memory 174, which can be similar to those described above for the computer 110, and which provide 3D scene rendering program 176. The computer 170 can be part of one or more server computers of computer systems 150, which provide image rendering as a cloud service to one or more client computers, such as computer 110.

The 3D scene rendering program 176 can receive a request to render a 3D scene including at least one surface. In response, the 3D scene rendering program 176 can perform ray tracing for the 3D scene including: calculating a ray spread value for a ray propagated through the 3D scene, where the ray spread value is calculated based on a reflection geometry of the at least one surface within the 3D scene, and calculating a ray divergence value for the ray propagated through the 3D scene, where the ray divergence value is calculated based on one or more material properties of the at least one surface. When the ray tracing process is completed, a filter can be defined by the 3D scene rendering program 176, and the 3D scene can be rendered using the filter. Then, the 3D scene rendering program 176 at the computer 170 can provide the rendered 3D scene back to the computer 110 for display on the display device 120 or other display devices. As will be appreciated, a single computer 170 need not be used, and two or more computers 170 can work in parallel to render a scene for provision to the computer 110, either in cooperation with the computer 110 or separately.

In any case, regardless of whether the rendering is performed locally (e.g., using 3D modeling program 116) and/or remotely (e.g., using 3D scene rendering program 176), calculating the ray spread value can include computing a ray differential for the ray propagated through the scene, and calculating the ray divergence value can include computing an estimate of divergence based on material properties of reflecting surfaces and a geometric model of light diffusion. With regard to computing ray differentials, this can involve using a known technique, as described in Igehy, "Tracing Ray Differentials", published in Computer Graphics SIGGRAPH '99 Proceedings of the 26th annual conference on Computer graphics and interactive techniques, pages 179-186, which is hereby incorporated by reference.

The renderer thus keeps track of the size of the filter it should use to query the environment. However, Igehy's ray differentials track the filter correctly only when the scene contains perfect mirrors, and they underestimate the filter in most other cases. The result of using ray differential tracking alone can thus be insufficient for removal of artifacts. In order to address this problem, more complicated filter tracking has been described, which handles more material variation, such as in Suykens, et al., "Path Differentials and Applications", published in EGWR'01 Proceedings of the 12th Eurographics conference on Rendering, pages 257-268. But path differentials can be expensive to compute and cannot be easily used with many materials models.

Thus, rather than using a more complicated filter tracking technique, with its corresponding increase in processing resources, the filter size can be tracked using the divergence of light paths originating at the camera, such as by calculating an estimate of divergence based on a geometric model of light diffusion. For example, the light divergence can be modeled using a simple cone. Computing how a cone grows when interacting with materials is a straight-foward math exercise and related fundamentally to parameters in many material models. This means the divergence tracking can be added readily to existing material implementations and is very fast to compute. After the cone is traced through the scene, the size of the filter of the environment image can be computed from the cone parameters.

Figure 2:
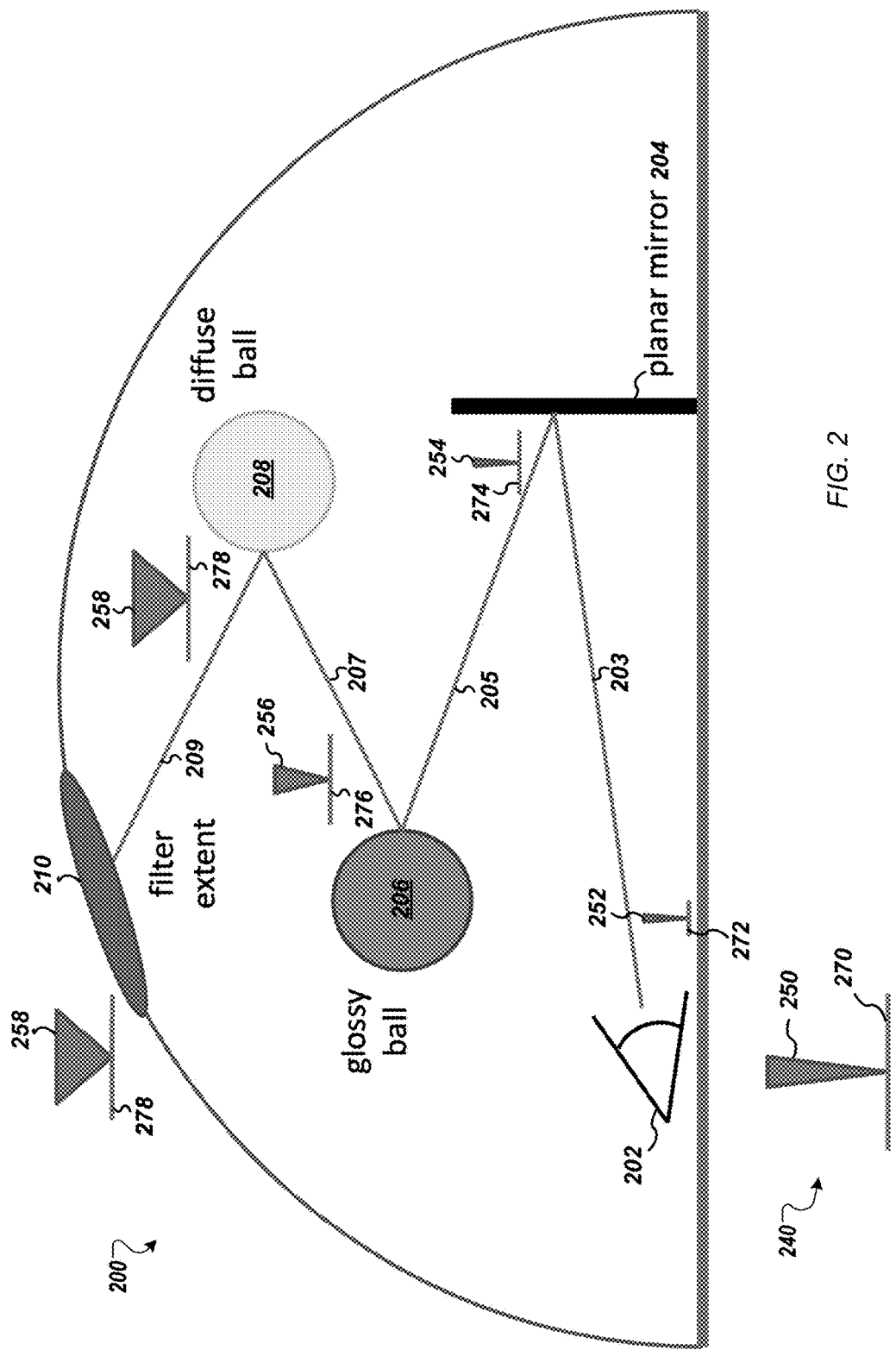
FIG. 2 is a block diagram showing an example of a process of ray tracing for environment mapping in which both a ray spread value and a ray divergence value are determined.

FIG. 2 is a block diagram showing an example of a process of ray tracing for environment mapping in which both a ray spread value and a ray divergence value are determined. In this example, the path of a ray traced through a scene 200 from a camera 202 to a light source 210 is shown in connection with a data structure 240. The data structure 240 includes two parts: a ray differential measure 270, and a ray divergence measure 250. As noted above, ray differentials can underestimate the size of the filter needed, so the ray divergence measure 250 is tracked in addition to the ray differential measure 270 to account for this. In other words, the ray divergence can be tracked to provide additional information to quantify the underestimate of the ray differential.

For a first portion 203 of the ray, the data structure 240 is initialized at the camera 202. In the example shown, a ray differential value 272 is combined with a ray divergence value 252, which is modeled as a cone structure. The ray differential accounts only for the geometry of the ray path, i.e., the distance travelled and reflections. The ray divergence modeled in accordance with a cone accounts for the spread of rays due to the material properties of each surface encountered.

The ray is traced forward and reflects off a perfect planar mirror 204 to create a second portion 205 of the ray. This case is accounted for by the ray differential so only it grows larger at this step, from an initial ray differential value 272 to a larger ray differential value 274. However, the divergence of a perfect mirror is zero. Thus, the ray divergence value 254 is equal to the ray divergence value 252.

The ray continues and reflects off a glossy surface of a glossy ball 206. The ray differential grows in this case from the ray differential value 274 to a ray differential value 276. However, the growth of the ray differential underestimates the true divergence of the ray after reflection since the glossy material of the surface of the ball 206 is not accounted for. The extra spread can be modeled by the cone and computed by evaluating this material's divergence function, such as described in further detail below, and this increase in divergence is measured by the increase from the ray divergence value 254 to a ray divergence value 256.

The ray continues in a third portion 207 and reflects off a diffuse surface of a diffuse ball 208. Diffuse surfaces spread the light even more than glossy surfaces so the cone grows faster from the third bounce of the ray than from the second bounce of the ray. As shown, the ray differential grows from the ray differential value 276 to a ray differential value 278, and the ray divergence grows even more from the ray divergence value 256 to a ray divergence value 258. This modelling of ray divergence using two different, independent measures allows the renderer to adapt the filtering to the particular materials encountered along the ray during ray tracing.

The ray then continues in its final portion 209 and arrives as the light source 210, where the filter extent can be determined. In this example, the light source 210 is an HDR (High Dynamic Range) environment map, but other textured light sources can be treated in the same manner. The current ray differential and cone modeled values 278, 258 are combined (e.g., using the methods described below) to compute the solid angle area on the surface of the environment. In some implementations, the data structure 240 can represent a filter size glyph that directly corresponds to the size of the filter to use, where the base ray differential 270 tracks size increases due to geometry, reflection and refraction, and the cone 250 tracks size increases from surface material properties. Further, as a filter, instead of returning the light emission found at the exact point of ray intersection, an average of the emission of the filter area is returned instead. In some implementations, this average is computed by querying the environment using a spherical mipmap using the computed solid angle.

Figure 3:
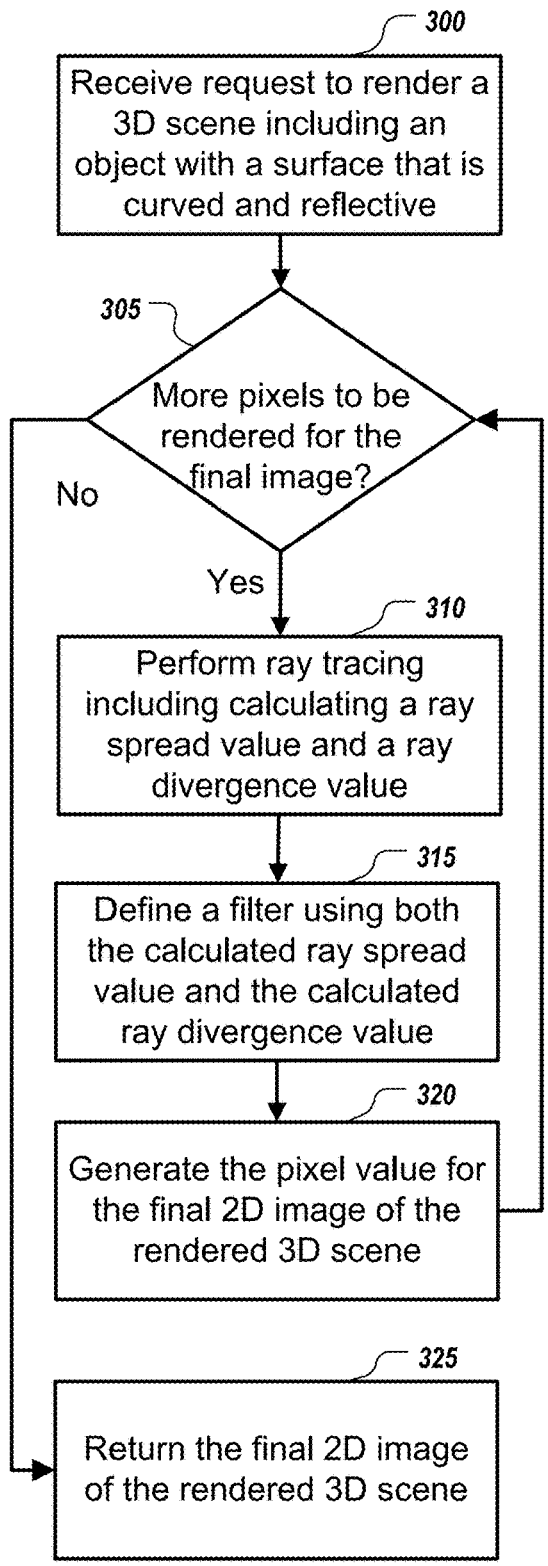
FIG. 3 is a flowchart showing an example of a process of ray tracing and filter based rendering.

FIG. 3 is a flowchart showing an example of a process of ray tracing and filter based rendering. In this process, a measure of ray divergence (e.g., a secondary data structure) is tracked during ray tracing so as to help in determining the size of a filter to use when evaluating the light source emission. Using a bigger filter will produce less noisy results for fewer rays traced. By using less rays, high quality images can be computed more quickly.

In the process of FIG. 3, a request is received 300 to render a three dimensional (3D) scene, which includes at least one object (and often many more) with a surface that is curved and at least partially reflective. This can be receipt of a program call from another part of a program application, e.g., a request received within the 3D modeling program 116, or this can be a request received over a network from another program running on a separate computer, e.g., a request received by the 3D scene rendering program 176. In any case, the request indicates that rendering of the 3D scene is to be performed, and this rendering process will include ray tracing, as described.

As discussed above, this ray tracing will include tracking of ray divergence. In this process, the region on a light source where the random rays from one pixel could have intersected, given different random camera positions, is estimated. When this area is estimate correctly, the light can be filtered to remove noise, but the filtering is limited such that the light from the source will not appear incorrectly blurred and degrade the final image quality. By tracking ray divergence in addition to a ray spread value, the region of the light source to use can be determined quickly and also accurately, even when the 3D scene includes objects that are not perfect mirrors, such as a mirrored surface that is abraded, where the light that hits this surface should be blurred due to abrasions causing the light reflection rays to diverge. Note that in many 3D scenes there are various objects that are partially reflective but not perfect reflectors and perfect transmitters.

A check is made 305 as to whether any more pixels remain to be rendered for the final image of the scene. Note that the description of the process of FIG. 3 presumes only one ray is traced per pixel of the final image, for ease of presentation. However, in practice, more than one ray (and often many) can be traced per pixel. In addition, rather than operate on a per-pixel basis, some implementations operate at a sub-pixel level since ray tracing is prone to aliasing, and antialiasing can be performed by tracing rays at multiple sub-pixel offsets on the image plane.

In any case, while pixels for the final image remain to be processed, ray tracing is performed 310 for the 3D scene, where this ray tracing includes calculating a ray spread value for a ray propagated through the 3D scene and reflected off the at least one surface of the at least one object, and also calculating a ray divergence value for the ray propagated through the 3D scene and reflected off the at least one surface of the at least one object. For each respective surface encountered (e.g., a curved and at least partially reflective surface) the ray spread value is calculated based on a geometric aspect of the surface, and the ray divergence value is calculated based on a diffusive property of the surface.

Further, the ray spread value can be a ray differential for the ray propagated through the 3D scene, which is calculated as described in Igehy, "Tracing Ray Differentials". As described by Igehy, because a ray is initially parameterized in terms of image space coordinates, in addition to tracing the ray, the value of the ray's derivatives with respect to the image plane can also be traced. A first-order Taylor approximation based on these derivatives gives an estimate of a ray's footprint. However, while this calculation during ray tracing is quick, it idealizes the scene to only contain perfectly reflecting or perfectly transparent objects. This results in an underestimate of the filter size for scenes with other types of materials. In other words, tracking the ray differential only accounts for the spreading of the ray resulting from the shape of mirrored surfaces and so underestimates the ray footprint in many 3D scenes, which include abraded or glossy mirrors, or other objects that are partially reflective and partially diffusive.

To account for the underestimate of the required spread and filter size, ray divergence is also tracked during the ray tracing. Ray divergence values can be computed as an estimate of divergence based on the diffusive property and a geometric model of light diffusion. This geometric model can be designed for quick calculation, such as where the geometric model of light diffusion is a circular cone, where the circular cone is understood as being attached to the point of intersection of light with a surface, and the body part of the cone is understood as enclosing the directions where light is likely to leave the surface due to its material properties other than perfect reflectance (e.g., the surface being an abraded mirror). Intuitively, the wider the base area of the cone, the larger the divergence caused by the material of the reflecting surface. Note that other geometric models can be used, including non-circular cones. In any case, a more accurate filter size can be estimated quickly for a wider range of materials using a combination of ray differential and ray divergence calculations during ray tracing.

In general, a filter is defined 315 using both the calculated ray spread value and the calculated ray divergence value. This can involve specifying the size of the filter to be used, the individual contributions of the elements of the filter, or both. For example, a ray differential can be converted into a cone and then convolved with a cone representation of the ray divergence to produce a larger cone, and this larger cone can be intersected with the geometry of a light source. For spherical HDR, this can be used to define a solid angle region of the HDR sphere to integrate. In some implementations, spherical mipmap is used to query the HDR map, which supports a filter query of the form (intersection point, solid angle)→filtered result. Note that the mipmap can only answer this approximately, but it returns a conservative estimate of the average value over a disk centered at the intersection point with the given solid angle.

Once the filter is defined, the pixel value for the final 2D image of the rendered scene can be generated 320 using the defined filter. For example, the filter can be used when evaluating emission of a textured light source. Once all the final values for all the pixels of the rendered scene have been generated, the process ends by returning 325 the 2D image of the rendered 3D scene. This can involve returning from a program procedure that was called, or this can involve sending a message over a network in cloud service implementations.

Figure 4A:
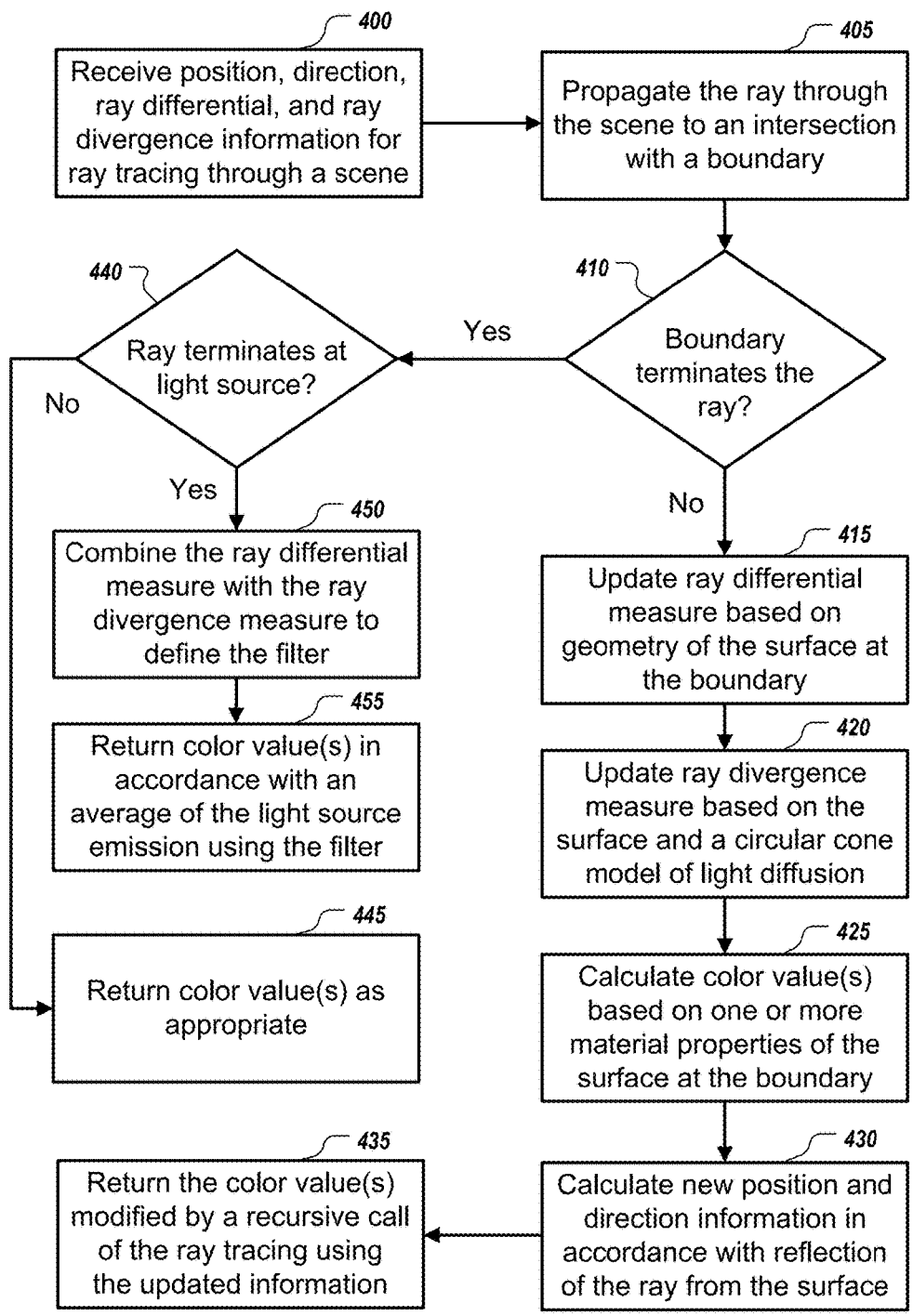
FIGS. 4A and 4B are flowcharts showing another example of a process of ray tracing and filter based rendering, which use recursive programming.

For ease of presentation, the description of the process of FIG. 3 is disclosed in the context of a single program that is called once for each 3D scene to be rendered. However, as will be appreciated, implementation of ray tracing techniques can involve recursive programming. FIG. 4A is a flowchart showing another example of a process of ray tracing and filter based rendering, which uses recursive programming. As discussed above, given that ray differentials underestimate the size of the filter, the goal of ray divergence is to track additional information to quantify this underestimate. Thus, for the recursive process of FIG. 4A, in addition to position and direction information for the ray being traced through a scene, ray differential and ray divergence information are received 400 when the recursive procedure is called, including initialized values upon a first procedure call in a recursive process.

The ray is then propagated 405 through the scene to an intersection with a boundary. This can be done using known techniques for ray tracing, which can be viewed as the evaluation of the position and direction of a ray as the ray propagates through the scene. In some cases, the boundary will be one that terminates the ray, such as the boundary of the 3D scene environment or a textured light source for the 3D scene. In other cases, the boundary will be an at least partially reflective surface of an object within the 3D scene.

In these latter cases, when it is determined 410 that the boundary does not terminate the ray, a ray differential measure is updated 415 based on the geometry of the surface at the encountered boundary. This can involve calculating a new ray differential value in accordance with the technique described in Igehy, "Tracing Ray Differentials". As described by Igehy, because ray differentials are based on elementary differential calculus rather than on differential geometry or another mathematical foundation that has an understanding of the 3D world, the technique may be readily applied with minimal processing resources being used.

Further, in these latter cases, the ray divergence measure is updated 420 based on the encountered surface and a circular cone model of light diffusion. In some implementations, the estimate of divergence is represented using only an interior angle between a central vector and an outer edge of the circular cone. This allows the divergence to be represented using one number. Note that the height of the cone is not needed because only the angles the cone contain, not its volume, is of interest for use in determining the filter size. Thus, the cone model can be normalized to have unit height, and the value that measures ray divergence can be readily tracked and quickly updated.

This approach can be advantageous since the shape model value should be quick to compute and estimate because it will often need to be updated billions of times during the rendering process. However, the simpler the model, the less accurate the final filter size estimate. Thus, there is a tradeoff here between the processing resources required by the representation and the quality of the estimate. In the testing performed when developing the present subject matter, it was found that a perfectly circular cone model works well and is also a very fast shape to compute. Nonetheless, some implementations of the subject matter described herein can employ other models, such as non-circular cones, multiple overlapping cones, pyramid shapes with angular bases, etc.

As noted above, the ray divergence measure is updated 420 based on the encountered surface, which includes determining a ray divergence measure in accordance with one or more material properties of the encountered surface. To support various types of materials that can be modeled in the 3D scene, the process estimates how much divergence is added by such different materials. Typically, materials in various 3D scenes can be defined by many different mathematical models so it often impractical to give exact derivations for all of them. However, a sufficient estimate can be derived using a technique that can be applied to any such model (or even future models yet unknown).

At the root, a material model is a function, f(x), that defines, given an input direction where light arrives at the material surface what fraction of light energy leaves in each possible reflected, output direction. To estimate the divergence of f(x), a circular cone can be defined, where the circular cone is centered at the material intersection point, and the circular cone contains the reflected directions for some percentage P of the light energy input (e.g., containment of 90% or 95% of the light energy input). Due to the physics of light, this cone should be centered on the mirror reflection direction of the surface and, as mentioned above, it can have a normalized height of 1 unit. With this model, a solution for angular extent (A) for the various materials can be determined. For all functions, f(x), P, A and f(x) are related by:

$$P=\mathrm{integral}(0,A,f(x)),$$

where integral(A, B, F) is the 3D, symmetric, definitive integral around the reflection direction between polar zenith angles A and B in radians. For some material model functions this integral equation can be inverted by hand. For others, A can be estimated from P and f(x) using numerical techniques. Either way, the result is a function A(x,P) which is given the cone radius for some given materials parameters and reflection percentage. Note that to use this technique, this A function should be implemented for all materials supported by the renderer, and the appropriate one of these A functions can be used in the update 420 based on the encountered surface.

In some implementations, a core renderer can use two shading models, such as Ward's model (described in Gregory J. Ward, "Measuring and Modeling Anisotropic Reflection", ACM-0-89791-479-1/92/007/0265) and the GGX model (described in Brent Burly, "Physically-Based Shading at Disney", SIGGRAPH 2012 Course: Practical Physically Based Shading in Film and Game Production). Both of these models are defined by an "alpha" parameter, which is the half-width of a Gaussian on the sphere. This Gaussian defines a similar value in the functions of these models to divergence. The cone width needed can be proportional to that half width times a cosine: cone=2*A*cos*alpha. Here the cosine is of the angle between the mirror reflection direction and the normal of the surface intersected. The exact value of A is related to the percentage of the reflection one wants to capture in the cone. However, in some implementations, the value of A can be an input constant (e.g., A=1) to the algorithm since increasing or decreasing this value allows control of the amount of filtering.

In addition, it should be noted that the current call of the ray tracing procedure of FIG. 4A may be the very first call (where the ray divergence measure is at its initialized value) or a later call after one or more other surfaces have already been encountered by the ray in the 3D environment (where the ray divergence measure has been updated previously). In either case, updating the ray divergence measure can involve computing a three dimensional convolution of a first circular cone and a second circular cone, where the first circular cone corresponds to the estimate of divergence received as input for the current call, and the second circular cone corresponds to an estimate of divergence for the encountered surface in the current call. Thus, as a ray propagates through the 3D scene and encounters various surfaces, the convergence of two cones resulting from two consecutive, divergent reflections can be combined by computing the 3D convolution of the two cones to find the bounding cone containing them both. In the case of the model being a simple, circular cone, the convolution reduces to summing their interior angles.

Separate from the updates of the ray differential measure and the ray divergence measure, one or more color values are calculated 425 based on one or more material properties of the surface at the encountered boundary. Thus, any coloring of the encountered surface can make its contribution to the final rendering, in accordance with known ray tracing techniques for scene rendering. Further, new position and direction information is calculated 430 in accordance with the reflection of the ray from the encountered surface, and the one or more color values, as modified by a next recursive call of the ray tracing using the updated position, direction, ray differential and ray divergence information (i.e., starting again with receiving 400) are returned 435.

Although only reflection is address above, it will be appreciated that other operations, such as handling of transmission, total internal reflection, and refraction can also be performed, including by the use of additional recursive calls of the ray tracing procedure, as appropriate. In addition, although this recursive process is shown as being terminated by the ray encountering a boundary that terminates the ray, it will be appreciated that other conditions can also be used to terminate the recursion, such as reaching a limit placed on the number of reflections that are allowed.

In any event, when a terminating boundary is reached by a ray, a check can be made 440 to determine if the ray has terminated at a light source. If not, one or more color values can be returned 445, as appropriate. If a light source is reached, the ray differential measure can be combined 450 with the ray divergence measure to define a filter to use. In essence, to support the rendering, an estimate of the size of the filter can be computed using ray differentials, and then the filter can be expanded further using ray divergence to account for the imperfect intermediate reflectors.

Figure 4B:
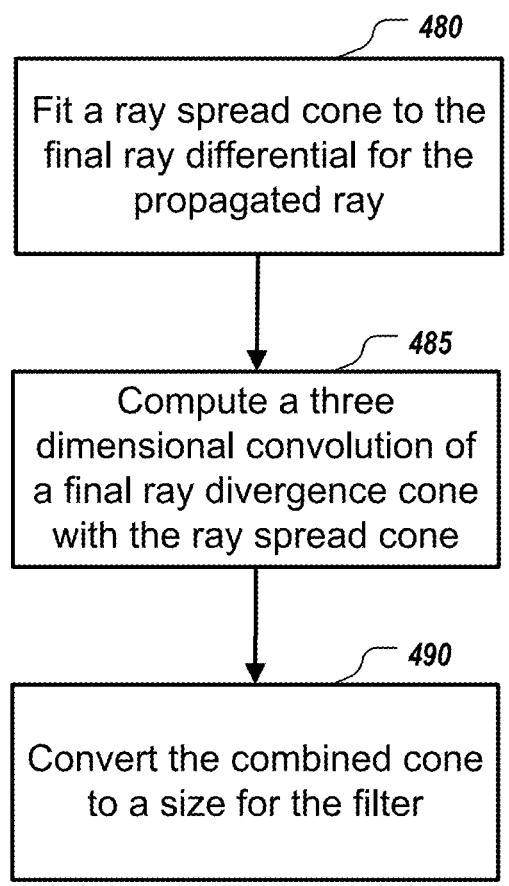

FIG. 4B shows an example of a process used to combine these two measures to define the filter. A ray spread cone can be fit 480 to the ray differential for the ray propagated through the scene. To get a cone from the ray differential, note that it contains the partial differentials of both the origin and direction of the ray with which it is associated. Note that the direction partials can be treated as the radii of the base of an elliptical cone. This can be converted to a circular bounding cone by using the larger of these radii. Then from that radius (R) the interior angle is calculated by the arccos (R).

A three dimensional convolution of a final ray divergence cone with the ray spread cone can be computed 485 to generate a combined cone, thus combining the two different estimators. This can be done as described above in connection with combining two ray divergence values, and the combined cone can be converted 490 to a size for the filter. For example, converting the combined cone to the size for the filter can involve using mipmapping to determine an area to filter color. Mipmapping is a known technique that creates a multi-resolution pyramid of the light emission data. Depending on whether the light is a spherical light map or a planar surface map, the mipmap associates an angular extent or surface area (respectively) with each pixel in the multi-resolution map.

Referring again to FIG. 4A, with the filter defined, one or more color values can be returned 455 in accordance with an average of the light source emission using the filter. The filter can be used when evaluating emission of a textured light source by returning an average of the emission of the textured light source from the area around a point of intersection of the ray with the textured light source. For example, to compute the final filtered color, the area of the combined cone can be projected onto the light surface, and the resolution of the mipmap where this area is smaller than one pixel can be found. A look up of the color in this mipmap pixel can be performed, and the color is then the next finer resolution map. Moreover, in some implementations, linear interpolation can be performed based on the size of the projected cone and the size of the pixel in the coarser resolution, i.e., tri-linear interpolation can be used in the mipmap operation.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), LED (light emitting diode) or OLED (organic light emitting diode) monitor, for displaying information to the user and a keyboard and a pointing device, e.g., a mouse or a trackball, or touch screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
   performing, by a computer, ray tracing for a scene to be rendered by the computer, wherein performing the ray tracing comprises
      calculating a ray spread value for a ray propagated through the scene, the ray spread value being calculated based on a reflection geometry of at least one surface within the scene, wherein calculating the ray spread value comprises computing a ray differential for the ray propagated through the scene, and
      calculating a ray divergence value for the ray propagated through the scene, the ray divergence value being calculated based on one or more material properties of the at least one surface, wherein calculating the ray divergence value comprises computing an estimate of divergence based on the one or more material properties and a geometric model of light diffusion;
   defining, by the computer, a filter using both the calculated ray spread value and the calculated ray divergence value; and
   rendering, by the computer, the scene using the filter.

2. The method of claim 1, wherein the geometric model of light diffusion is a circular cone.

3. The method of claim 2, wherein the estimate of divergence is represented using only an interior angle between a central vector and an outer edge of the circular cone.

4. The method of claim 2, wherein the at least one surface comprises a first surface and a second surface, and calculating the ray divergence value comprises computing a three dimensional convolution of a first circular cone and a second circular cone, the first circular cone corresponding to an estimate of divergence for the first surface, and the second circular cone corresponding to an estimate of divergence for the second surface.

5. The method of claim 2, wherein defining the filter comprises:
   fitting a ray spread cone to the ray differential for the ray propagated through the scene;
   computing a three dimensional convolution of a final ray divergence cone with the ray spread cone to generate a combined cone; and
   converting the combined cone to a size for the filter.

6. The method of claim 5, wherein converting the combined cone to the size for the filter comprises using mipmapping to determine an area to filter color.

7. A method comprising:
   performing, by a computer, ray tracing for a scene to be rendered by the computer, wherein performing the ray tracing comprises
      calculating a ray spread value for a ray propagated through the scene, the ray spread value being calculated based on a reflection geometry of at least one surface within the scene, and calculating a ray divergence value for the ray propagated through the scene, the ray divergence value being calculated based on one or more material properties of the at least one surface;

defining, by the computer, a filter using both the calculated ray spread value and the calculated ray divergence value; and rendering, by the computer, the scene using the filter, wherein rendering the scene using the filter comprises using the filter when evaluating emission of a textured light source.

8. The method of claim 7, wherein the filter has an area defined by both the calculated ray spread value and the calculated ray divergence value, and using the filter when evaluating emission of the textured light source comprises returning an average of the emission of the textured light source from the area around a point of intersection of the ray with the textured light source.

9. A non-transitory computer readable medium storing computer program instructions, the program instructions including instructions that cause one or more processors to perform operations comprising:

receiving a request to render a three dimensional (3D) scene including an object with a surface that is curved and at least partially reflective;

performing, responsive to the request, ray tracing for the 3D scene, wherein performing the ray tracing comprises calculating a ray spread value for a ray propagated through the 3D scene and reflected off the surface of the object, the ray spread value being calculated based on a geometric aspect of the curved and at least partially reflective surface, wherein calculating the ray spread value comprises computing a ray differential for the ray propagated through the 3D scene, and calculating a ray divergence value for the ray propagated through the 3D scene and reflected off the surface of the object, the ray divergence value being calculated based on a diffusive property of the curved and at least partially reflective surface, wherein calculating the ray divergence value comprises computing an estimate of divergence based on the diffusive property and a geometric model of light diffusion;

defining a filter using both the calculated ray spread value and the calculated ray divergence value; and rendering the scene using the filter.

10. The non-transitory computer readable medium of claim 9, wherein the geometric model of light diffusion is a circular cone.

11. The non-transitory computer readable medium of claim 10, wherein the estimate of divergence is represented using only an interior angle between a central vector and an outer edge of the circular cone.

12. The non-transitory computer readable medium of claim 10, wherein the surface of the object is a first surface of a first object, performing the ray tracing comprises calculating ray divergence values for the ray reflected off both the first surface and the second surface, and calculating the ray divergence value comprises computing a three dimensional convolution of a first circular cone and a second circular cone, the first circular cone corresponding to an estimate of divergence for the first surface, and the second circular cone corresponding to an estimate of divergence for the second surface.

13. The non-transitory computer readable medium of claim 10, wherein defining the filter comprises:

fitting a ray spread cone to the ray differential for the ray propagated through the scene;

computing a three dimensional convolution of a final ray divergence cone with the ray spread cone to generate a combined cone; and converting the combined cone to a size for the filter.

14. The non-transitory computer readable medium of claim 13, wherein converting the combined cone to the size for the filter comprises using mipmapping to determine an area to filter color.

15. A non-transitory computer readable medium storing computer program instructions, the program instructions including instructions that cause one or more processors to perform operations comprising:

receiving a request to render a three dimensional (3D) scene including an object with a surface that is curved and at least partially reflective;

performing, responsive to the request, ray tracing for the 3D scene, wherein performing the ray tracing comprises calculating a ray spread value for a ray propagated through the 3D scene and reflected off the surface of the object, the ray spread value being calculated based on a geometric aspect of the curved and at least partially reflective surface, and calculating a ray divergence value for the ray propagated through the 3D scene and reflected off the surface of the object, the ray divergence value being calculated based on a diffusive property of the curved and at least partially reflective surface;

defining a filter using both the calculated ray spread value and the calculated ray divergence value; and rendering the scene using the filter, wherein rendering the scene using the filter comprises using the filter when evaluating emission of a textured light source.

16. The non-transitory computer readable medium of claim 15, wherein the filter has an area defined by both the calculated ray spread value and the calculated ray divergence value, and using the filter when evaluating emission of the textured light source comprises returning an average of the emission of the textured light source from the area around a point of intersection of the ray with the textured light source.

17. A system comprising:

a non-transitory storage medium having instructions of a three dimensional (3D) scene rendering program stored thereon; and one or more data processing apparatus configured to run the instructions of the 3D scene rendering program to (i) receive a request to render a 3D scene including at least one surface, (ii) perform ray tracing for the 3D scene including (a) calculating a ray spread value for a ray propagated through the 3D scene, the ray spread value being calculated based on a reflection geometry of the at least one surface within the 3D scene, wherein calculating the ray spread value comprises computing a ray differential for the ray propagated through the scene, and (b) calculating a ray divergence value for the ray propagated through the 3D scene, the ray divergence value being calculated based on one or more material properties of the at least one surface, wherein calculating the ray divergence value comprises computing an estimate of divergence based on the one or more material properties and a geometric model of light diffusion,
(iii) define a filter using both the calculated ray spread value and the calculated ray divergence value,
(iv) render the 3D scene using the filter, and
(v) provide the rendered 3D scene for display.

18. The system of claim 17, wherein the geometric model of light diffusion is a circular cone, the surface of the object is a first surface of a first object, and the one or more data processing apparatus are configured to run the instructions of the 3D scene rendering program to perform the ray tracing performing by calculating ray divergence values for the ray reflected off both the first surface and the second surface, and calculating the ray divergence value comprises computing a three dimensional convolution of a first circular cone and a second circular cone, the first circular cone corresponding to an estimate of divergence for the first surface, and the second circular cone corresponding to an estimate of divergence for the second surface.

19. The system of claim 17, wherein the geometric model of light diffusion is a circular cone, and wherein the one or more data processing apparatus are configured to run the instructions of the 3D scene rendering program to define the filter by performing operations comprising:
fitting a ray spread cone to the ray differential for the ray propagated through the scene;
computing a three dimensional convolution of a final ray divergence cone with the ray spread cone to generate a combined cone; and
converting the combined cone to a size for the filter.

20. The system of claim 17, wherein the one or more data processing apparatus are configured to run the instructions of the 3D scene rendering program to render the scene using the filter by using the filter when evaluating emission of a textured light source, and wherein the filter has an area defined by both the calculated ray spread value and the calculated ray divergence value, and using the filter when evaluating emission of the textured light source comprises returning an average of the emission of the textured light source from the area around a point of intersection of the ray with the textured light source.

21. A system comprising:
a non-transitory storage medium having instructions of a three dimensional (3D) scene rendering program stored thereon; and
one or more data processing apparatus configured to run the instructions of the 3D scene rendering program to
(i) receive a request to render a 3D scene including at least one surface,
(ii) perform ray tracing for the 3D scene including (a) calculating a ray spread value for a ray propagated through the 3D scene, the ray spread value being calculated based on a reflection geometry of the at least one surface within the 3D scene, and (b) calculating a ray divergence value for the ray propagated through the 3D scene, the ray divergence value being calculated based on one or more material properties of the at least one surface,
(iii) define a filter using both the calculated ray spread value and the calculated ray divergence value,
(iv) render the 3D scene using the filter when evaluating emission of a textured light source, and
(v) provide the rendered 3D scene for display.

22. The system of claim 21, wherein calculating the ray spread value comprises computing a ray differential for the ray propagated through the scene, and calculating the ray divergence value comprises computing an estimate of divergence based on the one or more material properties and a geometric model of light diffusion.

23. The system of claim 22, wherein the geometric model of light diffusion is a circular cone.

24. The non-transitory computer readable medium of claim 15, wherein calculating the ray spread value comprises computing a ray differential for the ray propagated through the 3D scene, and calculating the ray divergence value comprises computing an estimate of divergence based on the diffusive property and a geometric model of light diffusion.

25. The non-transitory computer readable medium of claim 24, wherein the geometric model of light diffusion is a circular cone.

26. The non-transitory computer readable medium of claim 25, wherein the estimate of divergence is represented using only an interior angle between a central vector and an outer edge of the circular cone.

27. The non-transitory computer readable medium of claim 25, wherein the surface of the object is a first surface of a first object, performing the ray tracing comprises calculating ray divergence values for the ray reflected off both the first surface and the second surface, and calculating the ray divergence value comprises computing a three dimensional convolution of a first circular cone and a second circular cone, the first circular cone corresponding to an estimate of divergence for the first surface, and the second circular cone corresponding to an estimate of divergence for the second surface.

28. The non-transitory computer readable medium of claim 25, wherein defining the filter comprises:
fitting a ray spread cone to the ray differential for the ray propagated through the scene;
computing a three dimensional convolution of a final ray divergence cone with the ray spread cone to generate a combined cone; and
converting the combined cone to a size for the filter.

29. The non-transitory computer readable medium of claim 28, wherein converting the combined cone to the size for the filter comprises using mipmapping to determine an area to filter color.

30. The non-transitory computer readable medium of claim 9, wherein rendering the scene using the filter comprises using the filter when evaluating emission of a textured light source, and wherein the filter has an area defined by both the calculated ray spread value and the calculated ray divergence value, and using the filter when evaluating emission of the textured light source comprises returning an average of the emission of the textured light source from the area around a point of intersection of the ray with the textured light source.

31. The method of claim 7, wherein calculating the ray spread value comprises computing a ray differential for the ray propagated through the scene, and calculating the ray divergence value comprises computing an estimate of divergence based on the one or more material properties and a geometric model of light diffusion.

32. The method of claim 31, wherein the geometric model of light diffusion is a circular cone.

33. The method of claim 32, wherein the at least one surface comprises a first surface and a second surface, and calculating the ray divergence value comprises computing a three dimensional convolution of a first circular cone and a second circular cone, the first circular cone corresponding to an estimate of divergence for the first surface, and the second circular cone corresponding to an estimate of divergence for the second surface.

34. The method of claim 32, wherein defining the filter comprises:
   fitting a ray spread cone to the ray differential for the ray propagated through the scene;
   computing a three dimensional convolution of a final ray divergence cone with the ray spread cone to generate a combined cone; and
   converting the combined cone to a size for the filter.

35. The method of claim 1, wherein rendering the scene using the filter comprises using the filter when evaluating emission of a textured light source, and wherein the filter has an area defined by both the calculated ray spread value and the calculated ray divergence value, and using the filter when evaluating emission of the textured light source comprises returning an average of the emission of the textured light source from the area around a point of intersection of the ray with the textured light source.

* * * * *